United States Patent [19]
George et al.

[11] 3,935,369

[45] Jan. 27, 1976

[54] METHODS OF MANUFACTURING AN INSULATED CONDUCTOR AND PRODUCT PRODUCED THEREBY

[75] Inventors: Emanuel John George, Atlanta, Ga.; Joseph Lane Salter, Lutherville, Md.; Earl Salvator Sauer; Charles Edward Tidd, Jr., both of Baltimore, Md.

[73] Assignee: Western Electric Company, Inc., New York, N.Y.

[22] Filed: Nov. 2, 1973

[21] Appl. No.: 412,362

[52] U.S. Cl. .............. 428/379; 427/120; 427/318
[51] Int. Cl.² ........................................ C08G 45/04
[58] Field of Search .......... 117/132 BE, 132 C, 137, 117/232; 260/836; 427/120, 318; 428/379

[56] References Cited
UNITED STATES PATENTS

| | | | |
|---|---|---|---|
| 2,564,194 | 8/1951 | de Nie et al. | 260/45.8 |
| 2,609,355 | 9/1952 | Winkler | 260/45.8 |
| 3,141,850 | 7/1964 | Lybeck | 117/232 X |
| 3,291,857 | 12/1966 | Howerton | 260/836 |
| 3,508,963 | 4/1970 | Izumi et al. | 117/232 |
| 3,513,222 | 5/1970 | Speitel et al. | 260/836 |
| 3,579,608 | 5/1971 | DeCoste | 260/837 |
| 3,623,940 | 11/1971 | Gladstone et al. | 117/93.31 X |
| 3,657,381 | 4/1972 | Speitel et al. | 260/836 |
| 3,804,669 | 4/1974 | Bockstie | 117/232 X |

*Primary Examiner*—Michael R. Lusignan
*Attorney, Agent, or Firm*—E. W. Somers

[57] ABSTRACT

A priorly used three layer insulation covering for conductors forming a drop wire for connecting aerial distribution cables to a subscriber's premises is replaced with a single layer insulation of a plasticized polyvinyl chloride composition.

It has been found that the temperature of preheat of the conductors must fall with a critical range to control the adhesion of the composition to the conductors to be within a desired range of values. The adhesion of the composition to the conductors is important from the standpoint of the manner of installation and of strippability. The adhesion must be sufficient to facilitate support of the drop wire by a clamp customarily attached to the subscriber's premises. However, the adhesion must not be excessively high in that the forces required to strip the insulation from the conductors may damage the surfaces of the conductor.

9 Claims, 6 Drawing Figures

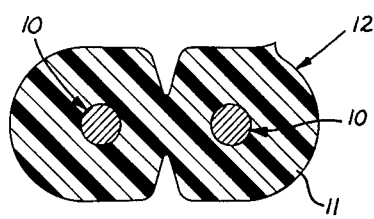
FIG. 1
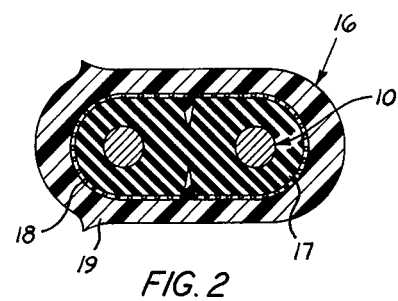
FIG. 2
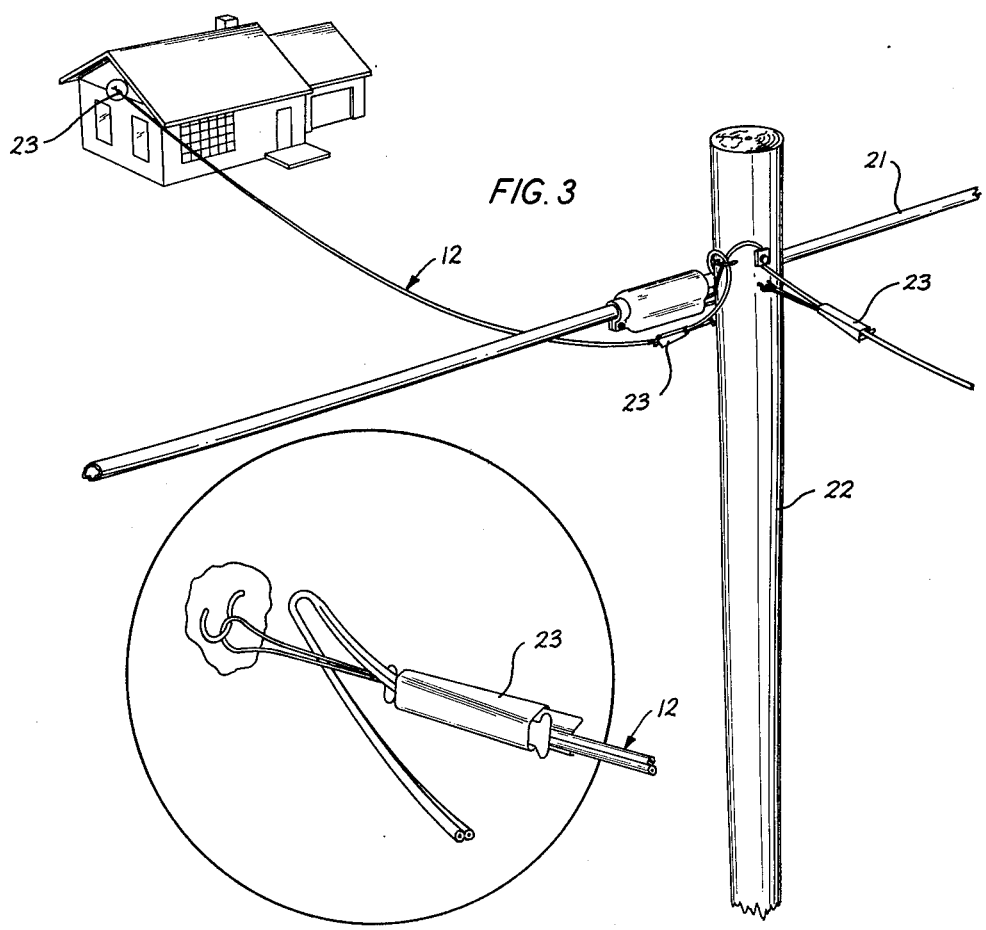
FIG. 3
FIG. 4 ced drop wire was disclosed and claimed in U.S. Pat. No. 3,579,608 issued on May 18, 1971 to John B. DeCoste. In that application, there was shown an abrasion-resistant insulating coating which included a plasticized polyvinyl chloride in combination with a brominated epoxy resin. It was disclosed that the composition possessed superior abrasion-resistant properties and adhered directly with the surface of a heated conductor. This avoided the necessity in prior art processes of applying a suitable adhesive to the conductor surface prior to the application of the insulation material thereover.
METHODS OF MANUFACTURING AN INSULATED CONDUCTOR AND PRODUCT PRODUCED THEREBY

BACKGROUND OF THE INVENTION

1. Field of the Invention

This invention relates to methods of manufacturing an insulated conductor and the article produced thereby, and, more particularly, to methods of applying a plastic covering to an electrical conductor to provide a plastic covered conductor having a controlled adhesion of the plastic covering to the conductor.

2. Prior Art and Technical Consideration

Insulated electrical conductors, such as those employed in telephone installations, are often subjected to outdoor use or to conditions that expose the insulation to the deteriorating influences of light, weather, and possibly abrasion. With respect to telephone drop wire, which is the familiar black overhead wire comprised of two parallel spaced conductors that brings telephone service from the telephone pole to the home, it has been customary to enclose the conductors with an extruded rubber insulation covered by a cotton serving, and jacketed with a neoprene compound. Although such protective coatings have been in widespread use for many years and have proven satisfactory from most standpoints, there has been a long felt desire to develop an alternative, less expensive, insulation.

Of course, any alternative covering must have specific properties to fill the requirements of this type of wire. For example, it is important that the plastic covered drop wire be covered with an insulation material which has adequate properties to withstand exposure to the elements, as well as adequate low temperature flexibility, impact resistance, and abrasion resistance.

Each end portion of the wire is inserted into a metallic clamp. One of the clamps is attached to a subscriber's premises and the other one to a telephone pole prior to the electrical connection of the drop wire to wiring run inside the subscriber's premises and aerial distribution cables, respectively. At both the subscriber and the pole end of the drop wire, the retention of the wire in engagement with the clamp is effected by reactive forces exerted by the clamp on the insulation. If this is not transferred from the insulation to the conductors by the adhesion therebetween, the insulation may pull from the conductors and the entire weight of the drop wire would be held by the terminal connection. This may very well lead to a disconnection of the circuit.

On the other hand, if the adhesion between the composition and the conductors is too great, there may be problems in attempting to strip the covering from the conductors. Too great an adhesion could require an excessive scraping activity that would remove some of the metallic material from the surface portion of the conductors thereby increasing the electrical resistance and changing the conductivity thereof. Excessive scraping also unduly reduces the cross-sectional area of the wire or knicks it thereby reducing the strength properties of the wire to the detriment of its weight-supporting capability.

Drop wires have been manufactured in which coverings other than the three layer covering hereinbefore described have been used and which possess the requisite properties which includes optimum adhesion. These have generally involved the precoating of conductors with an adhesive followed by the final plastic insulation. This disadvantageously involves an extra manufacturing step.

A composition of matter for producing a plastic covered drop wire was disclosed and claimed in U.S. Pat. No. 3,579,608 issued on May 18, 1971 to John B. DeCoste. In that application, there was shown an abrasion-resistant insulating coating which included a plasticized polyvinyl chloride in combination with a brominated epoxy resin. It was disclosed that the composition possessed superior abrasion-resistant properties and adhered directly with the surface of a heated conductor. This avoided the necessity in prior art processes of applying a suitable adhesive to the conductor surface prior to the application of the insulation material thereover.

In the above-identified patent, it was disclosed that the conductors over which the plastic material is deposited should be preheated within the range of 200° to 250°C (392° to 482°F) prior to entering the cross head die of an extruder. It was disclosed in that patent that preheating the conductor to temperatures less than 200°C resulted in weak bonding of the coating to the wire whereas temperatures in excess of over 250°C adversely affected the properties of the plastic composition.

It has been found that in order to obtain an optimum permanent adhesion of the plastic composition to the conductor, certain changes to the process disclosed in the above-identified patent are necessary.

SUMMARY OF THE INVENTION

In accordance with the principles of the invention, methods are provided for covering a metallic strand material with a composition to provide a covered strand material in which the adhesion of the composition to the metallic strand material is controlled and is within aa specified range of values.

A method for covering a conductor with a composition which includes a plasticized polyvinyl chloride, an epoxy resin, a metallic stabilizer, a filler system, a flame retardant constituent and a carbon black constituent includes the step of preheating a bare conductor to a temperature within the range of 525° to 675°F such that the extrusion of the composition on the conductor causes the composition to undergo reactions, with byproducts of the reactions causing the requisite adhesion of the composition to the conductor.

BRIEF DESCRIPTION OF THE DRAWINGS

The various features of the invention will be more readily understood from the following detailed description when read in conjunction with the accompanying drawings wherein:

FIG. 1 is a cross-sectional view of a drop wire covered with an insulating composition and manufactured in accordance with the principles of this invention;

FIG. 2 is a cross-sectional view of conductors having a three layer covering and representing the prior art drop wire;

FIG. 3 is a perspective view showing a typical installation of the drop wire to a subscriber's premises;

FIG. 4 is an enlarged view of the circled portion of the subscriber's premises shown in FIG. 3 and for purposes of clarity illustrating the details of the provisions for supporting one end of the drop wire adjacent the subscriber's premises;

DETAILED DESCRIPTION

Figure 5:
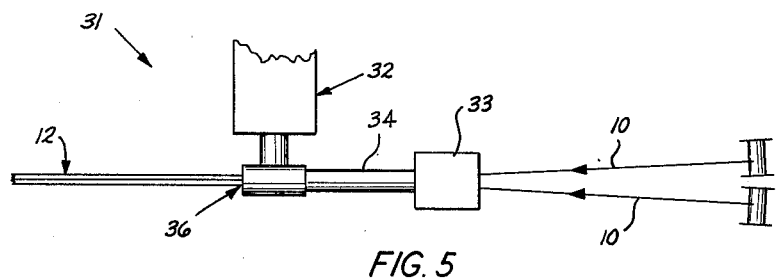
FIG. 5 is a view of an apparatus for applying the composition to the wire in accordance with the principles of this invention.

A strand material in the form of a conductor 10 to be insulated with a composition such as that disclosed in U.S. Pat. No. 3,579,608, or in accordance with the composition disclosed and claimed in this application, is an electroformed conductor having a diameter of approximately 0.038 inch. The conductive element of the conductor 10 is a copper-clad steel strand material.

A typical overhead transmission line for connecting the subscriber's premises to aerial distribution cables may be manufactured in accordance with the principles shown in U.S. Pat. No. 2,686,859, issued Aug. 17, 1954 in the names of Alvin N. Gray and Guy E. Murray. In order to provide the transmission member with strength, a high tensile strength steel core is used. According to recognized electrical principles, maximum conductivity should exist in the surface portion of an overhead transmission line. To insure such conductivity, a copper coating is applied over the steel core. A variation of this construction is shown in a patent issued in the name of Alvin Gray, U.S. Pat. No. 2,689,399 issued on Sept. 21, 1954.

Two of the conductors 10—10 having the hereinbefore described construction are covered with a composition of matter which forms an insulative covering 11. (see FIG. 1). The insulation covering 11 is extruded simultaneously over a spaced pair of spaced conductors 10—10 to form the configuration shown in FIG. 1 which is commonly referred to as a drop wire, designated generally by the numeral 12.

The drop wire 12 which includes electroformed conductors 10—10 covered with the insulation 11 replaces the priorly used three layer drop wire, designated generally by the numeral 16 and shown in FIG. 2. In that construction, electroformed conductors 10—10 each included a copper covered steel core and outer brass layer with a layer of lead interposed between the brass and the copper. The conductors 10—10 were enclosed first with a rubber covering 17 followed by a textile serving layer 18 and an outer covering 19 made of neoprene. A chemical reaction occurs between a sulphur constituent of the rubber and the brass in order to promote adhesion between the composition and the conductors 10—10. The lead layer was necessary to prevent the sulphur from also reacting with the copper which could impair the conductivity thereof. As should be apparent, the plastic covered drop wire 12 may be manufactured advantageously with less operations than the prior art drop wire 16 shown in FIG. 2. Moreover, line speeds may be increased since the slower process involving the vulcanization of the neoprene and the serving of textiles has been eliminated.

The drop wire 12 is used to bring telephone service from overhead aerial distribution cables 21—21 strung between telephone poles 22—22 to subscriber's premises. (see FIG. 3). One end of the drop wire 12 is supported from a wedge-shaped clamp 23 attached to a pole 22 and then connected to the cable 21 while the other end is supported from a similar clamp attached to the subscriber's homes (see FIG. 4). From there an electrical connection is made to conductors which are now inside the premises to the telephone handsets or other subscriber equipment.

The drop wire 12 forms generally a catenary between the two wedge-shaped clamps 23. The load due to the weight of the length of the drop wire in the catenary causes forces to be exerted between the clamps and the ends of the drop wire. The clamp 23 engages with the outwardly facing surface of the insulation 11. It should be apparent that if there is insufficient adhesion between the inwardly facing surface of the insulation 11 and the conductors 10—10, the reaction of the clamp 23 on the drop wire 12 could cause the insulation layer to be pulled therefrom and the drop wire to be undesirably supported solely by the terminal connections. It follows that the composition as applied to the conductors 10—10 must form a drop wire 12 having at least a sufficient minimum adhesion of the wire to the insulation.

There are also considerations which mitigate against an overly high adhesion. For example, excessive adhesion would render the drop wire extremely difficult to strip during interconnection operation overcoming the adhesion to remove the insulation, an installer could knick the conductors 10—10. This may affect adversely the electrical properties of the conductors 10—10 as well as penetrate the copper cladding thereby exposing the steel core to possible corrosion. Hence, there is a critical upper limit of adhesion values as well as a critical lower limit thereof because of the use to which the drop wire 12 is subjected.

Lastly, the composition as applied to the conductors 10—10 must have requisite physical and electrical properties and must not degrade during the processing thereof. For example, the composition must be tough, have adequate low temperature flexibility, acceptable resistance to compression, ultra-violet resistance, acceptable weatherability and adequate flame-retardance because of the installation adjacent subscriber's premises.

The composition which is used to form the insulation covering 11 includes a polyvinyl chloride resin material, a homopolymer, (hereinafter referred to as PVC). The PVC resin has all the characteristics associated with the homopolymer, which includes some abrasion resistance, but which in and of itself is unstable. However, when the PVC resin is caused to soften during processing, which is necessary to process the composition, resistance to abrasion is reduced. Further, the PVC must be a suitable electrical grade homopolymer.

Commercial PVC polymers which may contain up to 20 percent, or preferably up to a maximum of 10 percent, by weight of comonomers or other admixed materials such as propylene may be used. For example, PVC vinyl acetate or PVC polypropylene may be used without significant adverse effect.

The PVC resin may be any of a number of PVC resins well known in the art for use in electrical insulation. In accordance with the ASTM Standard for 1966, several PVC resins may be classified as within the range of from GP4-00003 to GP6-00003, inclusive. Definition of these characteristics are set forth in the ASTM Standard under designation D1755-66.

Briefly, the designations GP designate a general purpose resin. The first numerals (4 through 6) represent a polymer molecular weight in terms of dilute solution viscosity and the last digit 3, indicates the usual preference for electrical conductivity less than 18 ohms per centimeter per gram. This electrical characteristic is, of course, not a basic requirement from the standpoint of the inventive teaching. The bar under or the bar over a numeral indicates a value less than or more than, respectively, the numeral. The four ciphers in the designations indicate that the properties of particle size, apparent bulk density, plasticizer absorption and dry flow may be any ASTM designated level, i.e., 1–9, and, therefore, these properties are not critical for the inventive purposes.

It is convenient to discuss concentrations in terms of parts by weight based on 100 parts of the polymeric material. The term polymeric material is defined as the PVC or the total admixed PVC. Concentrations so designated, therefore, result in compositions having greater than 100 parts.

Combined with the polyvinyl chloride is a brominated epoxy resin which is the diglicidyl ether of brominated Bisphenol A obtained by reacting epichlorohydrin with Bisphenol A and sodium hydroxide in the presence of bromine. The desired brominated epoxy resin is evidenced by a bromine content of from 18 to 48 percent and an epoxy equivalent ranging from 200 to 520, such ranges being dictated by practical considerations.

In carrying out the process of this invention for the preparation of the composition for covering the copper-clad steel conductor, it has been found that from 3 to 10 parts by weight of the brominated epoxy resin per 100 parts, by weight, of polyvinyl chloride are required. If less than 3 parts of the brominated epoxy resin are used, there is insufficient adhesion between the insulation and the copper-clad steel conductors 11—11. The upper limit of the range of the amount of brominated epoxy resin is set by economic considerations. If more than 10 parts are used, the gain in adhesion of the insulation 12 to the conductors 12—12 is disproportionately low compared to the increase in cost.

A brominated epoxy resin, designated Epi-Rez 5163, as manufactured by the Celanese Corporation has been found to be adequate for purposes of this invention. This constituent is based on a tetrabromobisphenol A that is suitable for composition requiring a higher degree of flame resistance. It is a low melting solid resin that can be used in solvent free systems at moderately elevated temperatures or in solvent systems at room temperature. The Epi-Rez 5163 also has a very high bromine content, in the vicinity of 48 percent.

Combined with the PVC homopolymer resin and the brominated epoxy resin, is a phthalate plasticizer which is included to impart specific physical properties to the composition. The plasticizer provides a suitable degree of low-temperature flexibility to the composition. This is necessary to render the drop wire useable in a wide variety of environmental conditions. The plasticizer also facilitates the processing of the compound in the mixing thereof and in the application to the conductors 10—10.

The phthalate plasticizer in a preferred concentration is added to the polyvinyl chloride in about 55–65 parts by weight, per 100 parts by weight of the polymeric material. If less than 55 parts by weight are employed, the composition would have unacceptably low temperature flexing properties. If this constituent is added to the composition in an amount greater than 65 parts by weight per 100 parts by weight of the polymeric material, the electrical properties of the insulation 11 are impaired as is the compressive strength thereof. The insulation 11 becomes softer which is an unacceptable feature of a drop wire. A suitable phthalate plasticizer is one which is designated PX-318 as marketed by U.S. Steel Chemicals.

Combined with the PVC resin, the phthalate plasticizer, and the epoxy resin is a stabilizer constituent. The stabilizer is added into the composition in order to provide the composition with heat stability during the extrusion thereof. Without a heat stabilizer, the composition may undergo thermal degradation during the processing thereof, causing the resulting drop wire 12 to be unacceptable.

A metallic stabilizer has been found to provide adequate heat stability for this composition. A preferred concentration of the metallic stabilizer has been found to be about 3 to 7 parts by weight per 100 parts by weight of the polymeric material.

If less than three parts by weight are used, the heat stability of the composition during mixing and at the extruder is reduced with subsequent reduction in processing time. This causes unsatisfactory processing with degraded material being applied to the conductors 10—10. On the other hand, an increase beyond seven parts by weight produces slight gains in heat stability at disproportionate increase in composition cost.

It has beeen found that a metallic stabilizer as marketed by the N. L. Industries, Inc. under the designation Tribase E-XL is satisfactory for purposes of this composition.

Combined with the PVC resin, the epoxy resin, the phthalate stabilizer and the metallic stabilizer is a filler system. The system acts as an extender for the composition. The filler system may include any one of or all of ingredients such as calcium carbonate, fumed silica and a calcined clay. The calcium carbonate, which was the only filler disclosed in the composition patented by J. B. DeCoste, may detract somewhat from the low temperature flexibility of the composition and the impact resistance thereof. In order to diminish this potential adverse effect, the calcium carbonate has been reduced and supplemented by the other above-identified fillers.

A preferred concentration of the filler system is approximately 5 to 35 parts by weight per 100 parts by weight of the polymeric material. If the filler system constitutes less than 5 parts by weight, the filler system becomes ineffective with the electrical properties of the composition being sacrificed. The higher the filler concentration, the lower the plasticizer concentration and generally the better are the electrical properties. On the other hand, if more than 35 parts by weight of the filler system are used, the low temperature flexibility and impact properties of the composition are affected adversely.

While only one of the fillers may be used, it would be advisable to use a combination of the three to obtaian optimum physical and electrical properties. At the very least, calcium carbonate should not be used as the sole constituent of the filler system because of the above-mentioned problems. A calcium carbonate suitable for purposes of this composition is manufactured by Harry T. Campbell Sons Company, under the designation Camel-Wite, or one marketed by Georgia Marble Company. A suitable fumed silica constituent is one manufactured by the Cabot Corporation under the designation Cab-O-Sil M-5. Finally a suitable calcined clay is one marketed by Burgess Pigment Company and designated as 30P or a P33 calcined clay marketed by Freeport Kaolin Company.

Combined with the PVC resin, the epoxy resin, the phthalate plasticizer, the metallic stabilizer, and the filler system is a flame retardant constituent. The flame retardant constituent is necessary to impart adequate flame retardant properties to the drop wire especially since the drop wire is connected to subscriber's premises. The flame retardant constituent also acts as an additional filler to the composition.

A suitable flame retardant material is antimony trioxide, pigment grade. It has been found that a preferred concentration of the antimony trioxide is approximately 3 to 5 parts by weight per 100 parts by weight of the polymeric material. Less than three parts reduces the flame retardance of the composition to unacceptably low levels while a concentration in excess of five parts fails to provide a substantial improvement in flame retardance at excessive costs.

Added to the PVC resin, the epoxy resin, the phthalate plasticizer, the metallic stabilizer, the filler system and the flame retardant constituent, is a carbon black constituent. The carbon black constituent adds ultraviolet light and weather resistance to the composition as well as providing additional filling properties.

A preferred concentration of the carbon black constituent has been found to be approximately 1 to 3 parts by weight per 100 parts by weight of the polymeric material. Less than one part by weight causes insufficient protection against degradation of the drop wire due to ultra-violet light and heat exposure while greater than three parts by weight are unnecessary to protect the composition against these forces.

The weathering properties of the polyvinyl chloride composition are improved substantially by the inclusion of the carbon black constituent. It has been found that maximum protection is obtained by using a finely divided channel or furnace black with a maximum particle size of 25 $\mu$m. The carbon black must be well dispersed throughout the composition in order to be most effective.

It has been found that a suitable carbon black material for use in this composition is one designated Superba 999, as manufactured by the Cities Service Company.

EXAMPLES

The following examples illustrate various compositions prepared in accordance with the invention and applied to electroformed conductors in accordance with the principles of this invention to produce plastic covered drop wire. The examples are set forth in tabular form. For comparison purposes, all examples set forth were carried out using the PVC homopolymer described hereinbefore. All amounts are in parts by weight per 100 parts by weight of the PVC homopolymer.

TABLE I

| RANGES | CONSTITUENT | EXAMPLES | | | |
|---|---|---|---|---|---|
| | | A | B | C | D |
| 100 | PVC resin | 100 | 100 | 100 | 100 |
| 3–10 | Brominated epoxy resin | 7 | 3 | 10 | 5 |
| 55–65 | Phthalate plasticizer | 64.5 | 55 | 60 | 65 |
| 3–7 | Metallic stabilizer | 5 | 7 | 3 | 5 |
| 5–35 | Filler - CaCo$_3$ | 0 | 10 | 15 | 20 |
| | fumed silica | 5 | 0 | 0 | 5 |
| | calcined clay | 5 | 5 | 5 | 10 |
| 3–5 | Antimony trioxide | 3 | 5 | 4 | 3 |
| 1–3 | Carbon black | 2.5 | 3 | 1 | 2 |

All of the example compositions of Table I result in an acceptable composition which when applied to the conductors 10—10 result in a plastic covered drop wire having the required degree of adhesion of composition to the conductors 10—10.

Methods of Applying the Composition

The principles of the methods of this invention are used to apply the composition to metallic strand material in the form of the conductors 10—10 such that there is an optimum adhesion between the conductors and the composition. This must be determined from a consideration of several factors.

A certain value of permanent adhesion of the composition to the conductors 10—10 is necessary in the environment of the clamp used for supporting one end of the drop wire 12 adjacent the subscriber's premises. An adhesion of the composition to each conductor in the neighborhood of approximately 15–25 pounds is preferred with limits of 12–28 pounds being permitted. If the adhesion of the insulating composition to each conductor 10 is less than 12 pounds, then the clamp 23 may cause the insulation to pull away from the wire.

On the other hand, if the adhesion is greater than approximately 28 pounds, then it becomes very difficult to strip the insulation from the conductors 10—10. In that event it is possible that an installer could inadvertently scrape the conductors 10—10 thereby increasing the electrical resistance and changing the conductivity of the conductors. This could also result undesirably in an exposure of the steel core.

The conductor preheat temperatures taught in the prior art did not result in an insulated conductor having the desired permanent adhesion characteristics of insulation to metal. It was believed that if a temperature in excess of 482°F, a maximum value quoted in the prior art, was used, that there would be adverse effects on the final product. For example, it was felt that a temperature in excess of 482°F would degrade the compound and would cause unwarranted porosity in the composition adjacent to the conductor. Any porosity in the composition adjacent to the conductor would theoretically contribute to weakening the adhesion between the conductor and the composition.

Experimentation was also conducted with other compounds. There, when higher temperatures were used, porosity of the composition in and about the interface with the conductor was obtained. With this in mind and knowing that the composition of the DeCoste patent of 482°F did not yield desired adhesion values, there was serious doubt as to which avenue the development should take in order to obtain an acceptable plastic covered drop wire.

Alternatives to a single layer plastic composition drop wire were considered. In order to obtain a desired degree of adhesion, other companies in this technical area are known to use a precoat of an adhesive material on the outwardly facing surface of the conductors 10—10. Then an insulation composition is extruded over the precoat and the problem of obtaining adequate adhesion is avoided. However, using the precoat method disadvantageously limits the line speed over that which can be obtained by simply coating one composition over the conductors 10—10. The disadvantages of the precoat method led to the continued inquiry into a method of applying a single coating to the bare conductors 10—10. By using the principles of the method of this invention, a line speed of several times that which may be used in a precoat method may be realized.

In practicing the method embodying the principles of this invention, a pair of copper covered steel conductors 10—10 are advanced along a manufacturing line, designated generally by the numeral 31 (see FIG. 5) in spaced parallel relationship to be enclosed in a plastic composition. The composition is to be applied to the conductors 10—10 as they are advanced through a dual passageway core tube (not shown) of an extruder 32.

Prior to the entry of the wires 10—10 into the extruder 32, the wires are preheated to a temperature in the range of 525° to 675°F. The preheating of the wires 10—10 may be accomplished by any number of conventional preheating facilities, designated generally by the numeral 33, including inductive-resistance heating. In order to prevent heat losses in the conductors 10—10, the conductors are advanced through an insulated chamber 34 interposed between the preheating facilities 33 and the extruder 32.

In the process of preparing the composition for application to the wires 10—10 in accordance with the principles of this invention, the PVC admixed with a brominated Bisphenol epoxy resin and other compounding ingredients heretofore disclosed are fed through a hopper (not shown) and a feed port (not shown) into the extruder 32.

The composition is then admitted to the extruder barrel which has been preheated to a temperature slightly above the softening point of the polymers, typically in the range of 302° to 392°F, wherein it is thoroughly worked and fed along by the screw. Temperatures may vary from the softening point of the material to the ecomposition temperature thereof, permitting wide latitude in the selection of operating conditions. Further, the process is independent of the time in the extruder and practical consideration dictates selection of specific temperatures.

An extruder screw (not shown) is driven to move the PVC composition from the feed port through the barrel, which is heated by electric resistance heaters (not shown). During this period of time, the mixture is formed into intimate and substantially sliding contact with the barrel walls and is also sheared and worked. The combined effects of the heated barrel and the heat due to internal friction in the material causes the thermal plastic mass to be molten by the time it has traveled approximately one-fourth of the length of the extruder barrel. The molten mixture then continues through the barrel and proceeds toward the breaker plate which restricts its flow and creates back pressure.

The molten composition is forced through a breaker plate assembly (not shown) and then conducted to the wire guide core tube which is shaped so that the composition flows around either side of it and joins again on the side remote from the supply. The complete annulus of material then flows toward a die 36 and ultimately toward engagement with the conductors 10—10 passing through the die. It will be recalled that a definite preheat has been imparted to the conductors 10—10 which are moved continuously through the crosshead die 36. In this way, the composition is extruded over the preheated conductors which are moved continuously through the die 36 and which act as an internal forming mandrel.

The engagement of the composition with conductors 10—10 preheated to within the specified range apparently causes a reaction to occur within the composition in order to promote adhesion between the composition and the wire. It is theorized that the preheated conductors 10—10 cause the polyvinyl chloride to degrade at the interface of the copper-clad steel conductor and the covering composition. Hydrochloric acid is one of the byproducts of the degradation of the PVC. The hydrochloric acid is believed to act as a catalytic curing agent for the brominated epoxy resin giving an instant set at the interface of the conductor 10 and the composition thereby promoting adhesion between the composition and the wire. A very hard crust is formed at the interface with a conjugated double bond form of a hard organic material being formed. The hydrochloric acid degradation product is an efficient curing agent and minimizes the so-called pot life, i.e. the time the epoxidized constituent requires to cure.

There is a corollary theory for the success of the method of manufacturing drop wire in accordance with the principles of this invention. The presence of a lubricant dispersed uniformly throughout the composition may interfere with the adhesion of the composition to the conductors 10—10. The lubricant may exist in the form of a surface coating or be present in the stabilizer constituent, the filler system or as a sole constituent.

Where the lubricant engages the conductor 10, the adhesion is reduced. At the lower preheat temperatures specified in the prior art, there is insufficient hydrochloric acid liberated to react chemically with the epoxy resin to overcome the detrimental effect of the lubricant. At the temperatures specified in practicing this invention, the degradation of the PVC is such that sufficient hydrochloric acid is produced to react and cure the epoxy resin thereby minimizing the effect of the lubricant. Therefore, in order to obtain a controlled adhesion at sufficient contact sites on the surfaces of the conductor 10, the conductor must be preheated to a temperature such that the temperature thereof when the composition is extruded thereover is approximately 525° to 675°F.

It has been found that even with a stabilizer which does not include a lubricant that the lower temperature ranges will not result in successful adhesion of the composition to the wire. While the use of the upper limit of the temperature range stated in the above-identified DeCoste patent may result in adhesion of the wire to the composition which borders in the range of 8–12 pounds, the results are erratic and cannot be depended upon or in-line production control. In order to achieve a consistent conductor-to-composition adhesion of at least 12 pounds, it was unexpectedly found necessary to go to higher temperature ranges.

Also it has been found that the adhesion of the composition to the conductor 10 manufactured in accordance with the principles of this invention improves with aging. Upon aging, the bond between the conductor and the plastic composition becomes stronger thereby giving the required adhesion characteristics to the drop wire 12. Approximately fifteen minutes after the extrusion of the composition over the spaced conductor pair, it has been found that the adhesion of the composition to the wire is approximately 15 pounds. Approximately twenty-four hours later, the adhesion increases to 18–23 pounds. It is believed that the adhesion between the composition and the conductor 10 increases until an equilibrium condition within the composition is reached.

TESTING

The composition for producing plastic covered drop wire and the wire produced thereby must possess specified properties, some of which have been described hereinbefore. The following table, Table II, indicates the properties of a drop wire 12 insulated with a preferred composition, designated Example A in Table I.

TABLE II

TEST RESULTS FOR EXAMPLE A

| Preheat Temp. of Wire (°F) | 525 | 550 | 575 | 600 | 625 | 650 | 675 |
|---|---|---|---|---|---|---|---|
| Adhesion of Composition to Wire (lbs.) | 12.3 | 15.8 | 18.9 | (16.5)* 20.5 | 25.9 | 23.3 | 18.5 |

| Property | |
|---|---|
| Compressive strength | 800 to 1100 lbs. |
| Elongation | in excess of 300% |
| Insulation resistance | 200-1200 megaohms - 1000 ft. corrected to 60°F |
| Mutual capacitance | 0.040 microfarads per 100 ft. |
| Clamp holding test | satisfactory |

*It is believed that the value of 16.5 lbs. first achieved at a temperature of 600°F is untypical and may have been caused by the surface condition of the conductor 10. A subsequent run produced the value of 20.5 lbs. at this temperature.

Figure 6:
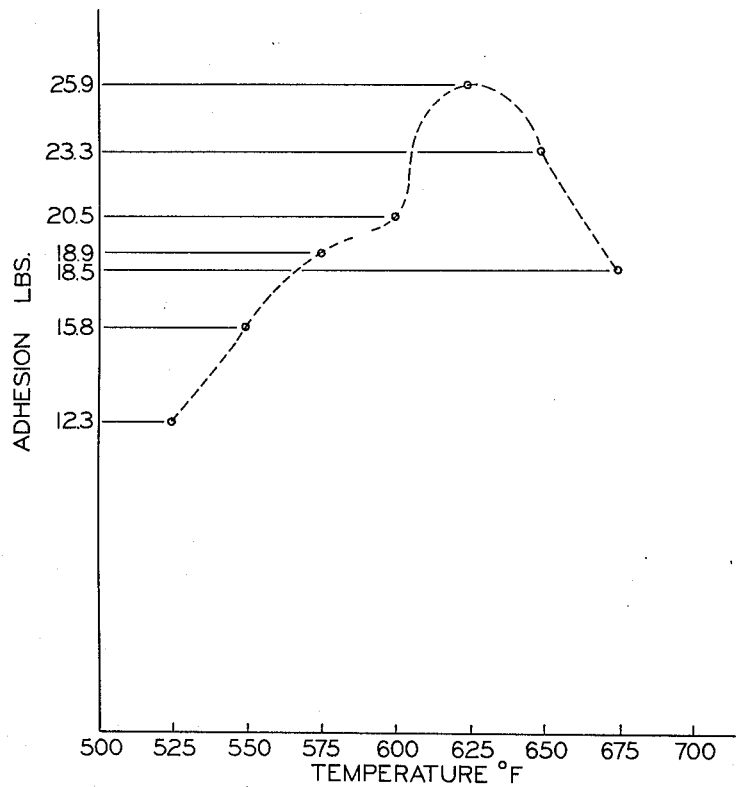
FIG. 6 is a graph using Cartesian coordinates and showing a plot of adhesion versus wire preheat temperature and showing a critical range for achieving an optimum range of adhesion values.

A plot of the adhesion values of each conductor 10 to the composition is shown in FIG. 6. Referring now to FIG. 6, it can be seen that the adhesion varies with respect to the conductor preheat temperature. Not only is there a critical lower limit below which the adhesion may be unacceptably low, but there is also an upper limit of temperature beyond which a decrease in values occurs. The temperature readings to which the adhesion values shown in FIG. 6 and in Table II correspond were taken adjacent the core tube of the extruder 32 with a line speed of approximately 450 feet per minute.

In order to test the adhesion of the composition to the conductors 10—10, the plastic covered drop wire 12 is subjected to what is referred to as a slip-off test. A portion of the wire 12 having a length of approximately 6 inches is split along the longitudinal centerline thereof to form two individual insulated conductors. A circumferential cut of the insulation is made 4 inches from the end of each conductor and then 4 inches of insulation are stripped from the one end of each of the conductors. From the circumferential cut of the insulation of each of the two conductors, a distance of three-eighths inch is measured off toward the other end and the conductor severed. In this way, conductors 4⅜ inches in length with three-eighths inch of insulation on one end thereof are formed. The bared portion of the conductor is clamped in a moveable test head (not shown) to move the bared portion through a measured orifice (not shown) having a diameter about 0.0010 inch larger than the diameter of the bared conductor. The force applied parallel to the axis of the conductor 10 and required to pull the ⅜-inch length of insulation from the other end of the conductor is measured. The applied force at which the insulation is "popped off" the conductor is recorded and is determined to be the magnitude of adhesion of the composition to the conductor.

It should be observed from FIG. 6 that after a wire preheat temperature of approximately 625°F, the adhesion of the insulation to the conductor decreases. Apparently, conductor preheat temperatures in excess of 625°F causes the bonding process hereinbefore described to become less effective. If the epoxy resin constituent is subjected to this excessive heat upon engaging the conductor 10, the bond between the conductor and the insulation can become degraded.

The drop wire 12 is also subjected to a compression test wherein it must withstand an 850 pound minimum crushing load. The insulation must also conform to specific elongation requirements. Any length of insulation removed from the drop wire 12 must be such that the elongation at break shall be 250% minimum when tested in accordance with ASTM D 470, except that the test temperature shall be 73.4 ± 2°F.

The drop wire 12 must also meet specific low temperature flexibility requirements. A sample of the drop wire 12 is wound flatwise around a test mandrel (not shown) having a maximum diameter of three-eighths inch at a temperature of −30° ± 2°F without cracking of the insulation. The mandrel and the sample shall be maintained at the test temperature for not less than 4 hours prior to the test.

Another important test is a so-called static load or clamp holding test. A sample of the drop wire 12 is held between two of the clamps 23—23 and subjected to a dead weight tension load of 290 pounds minimum for a minimum time of 24 hours without rupture of the insulation. After the load has been removed, the drop wire 12 shall withstand 10,000 volts (rms) minimum for five seconds between conductors and each one of the clamps 23—23.

Acceptable drop wire 12 shall also withstand an impact test without disclosing cracks in the insulation. With a test fixture and specimen at a test temperature of −20° ± 2°F for a minimum of 4 hours, a weight (not shown) is released in a guideway (not shown) at a height to provide a minimum specified gravitational potential energy to impact the surface of the drop wire 12.

It is to be understood that the above described arrangements are simply illustrative of the invention. Other arrangements may be devised by those skilled in the art which will embody the principles of the invention to fall within the spirit and scope thereof.

What is claimed is:

1. A method of covering a conductive member with a composition which includes a plasticized polyvinyl chloride, an epoxy resin, a stabilizer, a filler system, a flame retardant constituent, and a carbon black constituent, which includes the steps of:

advancing the conductive member along a path;

preheating the conductive member to a temperature within a specified temperature range of approximately 525° to 675°F; and extruding the composition over the conductive member while the temperature thereof is substantially within the specified temperature range, the temperature being sufficiently high to cause a sufficient chemical reaction of at least one of the constituents of the composition which causes the composition to develop an unexpectedly superior permanent adhesion with the outwardly facing surface of the conductive member, the magnitude of the adhesion being determined at least partially by the temperature to which the conductive member is preheated, further the magnitude of the adhesion being controlled to be consistently within a specified range.

2. The method of claim 1, wherein the conductive member is constructed of copper covered steel.

3. The method of claim 1, wherein the adhesion of the composition to the conductive member is consistently within the range of 12 to 28 pounds.

4. The method of claim 3, wherein the composition includes 100 parts by weight of a polymeric material; 3 to 10 parts by weight, per 100 parts by weight of the polymeric material, of a brominated epoxy resin; 55 to 65 parts by weight, per 100 parts by weight of the polymeric material of a phthalate plasticizer; 3 to 7 parts by weight, per 100 parts by weight of the polymeric material, of a metallic stabilizer; 5 to 35 parts by weight, per 100 parts by weight of the polymeric material, of a filler system; 3 to 5 parts by weight, per 100 parts by weight of the polymeric material, of a flame retardant constituent; and 1 to 3 parts by weight, per 100 parts by weight of the polymeric material, of a carbon black constituent.

5. The method of claim 3, wherein the composition includes 100 parts by weight of a polyvinyl chloride resin homopolymer; 7 parts by weight, per 100 parts by weight of PVC, of a brominated epoxy resin; 64.5 parts by weight, per 100 parts by weight of PVC of a phthalate plasticizer; 5 parts by weight, per 100 parts by weight of PVC, of a metallic stabilizer; 5 parts by weight, per 100 parts by weight of PVC, of a fumed silica filler; 5 parts by weight, per 100 parts by weight of PVC, of a calcined clay; 3 parts by weight, per 100 parts by weight of PVC, of an antimony trioxide; and 2.5 parts by weight, per 100 parts by weight of PVC, of carbon black.

6. An elongated transmission member having at least one copper covered steel conductor covered with an insulation composition which is applied in accordance with the method of claim 1.

7. The elongated transmission member of claim 6, the adhesion between the conductor and the composition being consistently within the specified range of 12–28 pounds.

8. The elongated transmission member of claim 7, wherein the composition includes 100 parts by weight of a polymeric material; 3 to 10 parts by weight, per 100 parts by weight of the polymeric material, of a brominated epoxy resin; 55 to 65 parts by weight, per 100 parts by weight of the polymeric material, of a phthalate plasticizer; 3 to 7 parts by weight, per 100 parts by weight of the polymeric material, of a metallic stabilizer; 5 to 35 parts by weight, per 100 parts by weight of the polymeric material, of a filler system; 3 to 5 parts by weight, per 100 parts by weight of the polymeric material, of a flame retardant constituent; and 1 to 3 parts by weight, per 100 parts by weight of the polymeric material, of a carbon black constituent.

9. The elongated transmission member of claim 7, wherein the preferred composition includes 100 parts by weight of a polyvinyl chloride resin, 7 parts by weight, per 100 parts by weight of the polyvinyl chloride resin, of a brominated epoxy resin; 64.5 parts by weight, per 100 parts by weight of the PVC, of a phthalate plasticizer; 5 parts by weight, per 100 parts by weight of PVC, of a metallic stabilizer; 5 parts by weight, per 100 parts by weight of PVC, of a fumed silica filler; 5 parts by weight, per 100 parts by weight of PVC, of a calcined clay; 3 parts by weight, per 100 parts by weight of PVC, of an antimony trioxide; and 2.5 parts by weight, per 100 parts by weight of PVC, of carbon black.

* * * * *